US008274678B2

(12) United States Patent
Ferlitsch et al.

(10) Patent No.: US 8,274,678 B2
(45) Date of Patent: Sep. 25, 2012

(54) METHOD AND SYSTEM FOR REMOTE ACCESS AND CUSTOMIZATION OF INTERNALLY GENERATED PRINTING NODE STATUS REPORT

(75) Inventors: Andrew Rodney Ferlitsch, Camas, WA (US); Joseph Bert Murdock, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1235 days.

(21) Appl. No.: 11/818,376

(22) Filed: Jun. 14, 2007

(65) Prior Publication Data

US 2008/0309967 A1   Dec. 18, 2008

(51) Int. Cl.
G06F 3/12 (2006.01)
G06K 15/00 (2006.01)
G03G 15/00 (2006.01)
G03G 15/08 (2006.01)
G03G 15/01 (2006.01)

(52) U.S. Cl. ............ 358/1.15; 358/1.13; 358/1.14; 399/11; 399/18; 399/21; 399/22; 399/23; 399/24; 399/25; 399/26; 399/27; 399/28; 399/29; 399/30

(58) Field of Classification Search .......... None
See application file for complete search history.

(56) References Cited

U.S. PATENT DOCUMENTS

| 6,473,788 | B1 | 10/2002 | Kim et al. | 709/209 |
|---|---|---|---|---|
| 6,782,495 | B2 | 8/2004 | Bernklau-Halvor | 714/44 |
| 6,912,674 | B2 | 6/2005 | Trelewicz et al. | 714/44 |
| 7,107,058 | B2 | 9/2006 | Inoguchi et al. | 455/450 |
| 2004/0095598 | A1* | 5/2004 | Snell | 358/1.15 |
| 2004/0109193 | A1 | 6/2004 | Smith et al. | 358/1.14 |
| 2004/0243601 | A1* | 12/2004 | Toshima | 707/100 |
| 2004/0260704 | A1 | 12/2004 | Moore | 707/100 |
| 2005/0049837 | A1* | 3/2005 | Reese et al. | 702/188 |
| 2005/0138065 | A1* | 6/2005 | Ciriza | 707/104.1 |
| 2006/0182451 | A1* | 8/2006 | Shoji et al. | 399/9 |

FOREIGN PATENT DOCUMENTS

| JP | 9198216 | 7/1997 |
|---|---|---|
| JP | 10-320912 | 12/1998 |
| JP | 2002/202879 | 7/2002 |
| JP | 2005-157101 | 6/2005 |
| JP | 2005-182445 | 7/2005 |

OTHER PUBLICATIONS

Masuda et al., Maintenance management system, JP Pub Date Jul. 7, 2005, JP Pub No. 2005-182445.*
Masuda et al.; Maintenance Management Syste . . . And Recording Medium; JP Pub Date Jul. 2005; Machine Translation in English of JP Pub No. 2005-182445.*

* cited by examiner

*Primary Examiner* — Benny Q Tieu
*Assistant Examiner* — Haris Sabah
(74) *Attorney, Agent, or Firm* — Scot A. Reader

(57) ABSTRACT

Methods and systems for facilitating remote access and customization of internally generated printing node status reports. In some embodiments, the methods and systems advantageously facilitate remote access and customization of internally generated printing node status reports by adapting preexisting features that generate local hard copies of printing node status reports in response to locally initiated commands. Such adaptation enables a printing node to receive, process and respond to remotely initiated requests for printing node status reports in a manner that permits remote customization of the style of printing node status reports.

14 Claims, 4 Drawing Sheets

METHOD AND SYSTEM FOR REMOTE ACCESS AND CUSTOMIZATION OF INTERNALLY GENERATED PRINTING NODE STATUS REPORT

BACKGROUND OF THE INVENTION

This invention relates to improving speed and ease of remote troubleshooting of problems with printing nodes and, more particularly, to methods and systems for facilitating remote access and customization of internally generated printing node status reports.

Many contemporary printing nodes, such as network-attached multifunction printers (MFPs), have an internal diagnostics feature that can test various hardware and software features of the printing node to determine status and output hard copies of printing node status reports containing status information on tested hardware and software features. These hard copies of printing node status reports are often transmitted by facsimile or scanned into electronic form and sent by email to remote technicians to isolate and troubleshoot problems with the printing node.

An example of such prior art printing node status report generation and remote transmission is illustrated in FIG. 1. A user wishing to resolve a problem with a printing node inputs a command on a user interface of the printing node, for example, the front panel, that prompts the printing node internal diagnostics feature to collect statistics 105, apply minimal formatting (e.g. text position) to the collected statistics 110, then convert the minimally formatted statistics into print data 115 represented in a page description language (PDL). The print data 120 are then rasterized 125 by internal raster image processing (RIP) to convert the print data 120 into print engine-ready data 130. The print engine-ready data 130 are then processed 135 by an internal print engine and the printing node outputs a local hard copy 140 of a printing node status report. The user manually carries the local hard copy 140 of the status report to a local fax machine 145 that transmits the status report to a remote fax machine 150, which outputs a remote hard copy 155 of the status report for review by a technician for problem isolation and troubleshooting.

The utility of the above approach is limited by the requirement of manual intervention by the user to initiate the status report from a user interface of the printing node, retrieve the local hard copy 140 of the status report from the printing node and fax (or scan and email) the local hard copy 140 of the status report to the technician. This consumes the users valuable time and requires that the user have a fax-capable printing node or ready access to a fax machine.

The utility of the above approach is further limited in that the technician is forced to view the printer status report in a style predetermined by the printing node.

SUMMARY OF THE INVENTION

The present invention, in a basic feature, provides methods and systems for facilitating remote access and customization of internally generated printing node status reports. In some embodiments, the methods and systems advantageously facilitate remote access and customization of internally generated printing node status reports by adapting preexisting features that generate local hard copies of printing node status reports in response to locally initiated commands. Such adaptation enables a printing node to receive, process and respond to remotely initiated requests for printing node status reports in a manner that permits remote customization of the style of printing node status reports.

In one aspect, a printing node comprises a network interface and a processor communicatively coupled with the network interface wherein the processor is adapted to receive a request for printing node status information via the network interface and in response to the request generate printing node status information, format the printing node status information in an internal printing format, reformat the printing node status information in a customizable viewing format and transmit a response including the reformatted printing node status information via the network interface. The internal printing format may be a proprietary page description language (PDL) print data format or a proprietary print engine-ready data format, for example. The customizable viewing format may be an extensible markup language (XML) data format, for example. The customizable viewing format may retain generic layout elements of the internal printing format, such as page boundaries, line boundaries and column positions of text sequences. The request may be an HTTP/HTML request, Web Services request or email request, for example. The response may be an HTTP/HTML response, a Web Services response or an email reply, for example. The request and response may be transmitted over the Internet. The response may further include a default style specification. The default style specification may specify an XML style sheet, for example. The printing node status information may comprise diagnostic information on printing node hardware or software, for example.

In another aspect, a printing node comprises a network interface and a processor communicatively coupled with the network interface wherein the processor is adapted to receive a request for printing node status information via the network interface and in response to the request generate printing node status information in a printer-specific format, convert the printer-specific format into a customizable viewing format, and transmit a response including the printing node status information in the customizable viewing format via the network interface.

In another aspect, a method for facilitating remote access and customization of internally generated printing node status reports comprises receiving from a remote node a request for printing node status information and in response to the request generating printing node status information, formatting the printing node status information in an internal printing format, reformatting the printing node status information in an customizable viewing format and transmitting to the remote node a response including the reformatted printing node status information.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 2A:
FIG. 2A shows a networked system in which methods and systems for facilitating remote access and customization of internally generated printing node status reports are operative in some embodiments of the invention.

In FIG. 2A, a networked system is shown in which methods and systems for facilitating remote access and customization of internally generated printing node status reports are operative in some embodiments of the invention. The system includes a remote node 210 communicatively coupled with a printing node 230 over a communication network 220. Remote node 210 is a data communication device, such as a personal computer, workstation, server, cellular phone or personal data assistant (PDA), that is capable of transmitting via a network interface a request for status information on printing node 230 and receiving via a network interface a response containing status information on printing node 230 that can be rendered on a display, such as a cathode ray tube (CRT) or liquid crystal display (LCD) panel, of remote node 210. Communication network 220 is a data communication network that includes one or more LANs, WANs, WiMax networks and/or ad-hoc networks each having one or more interconnected data communication nodes, such as access nodes, switches and routers, that communicatively couple remote node 210 and printing node 230. In some embodiments, communication network 220 traverses the Internet. Remote node 210 and printing node 230 are each directly communicatively coupled via a wired or wireless link to a different access node within communication network 220. Printing node 230 is a printing device having a network interface that is capable of receiving via a network interface a request for status information on printing node 230, processing the request, and transmitting via the network interface a response containing status information on printing node 230.

Figure 2B:
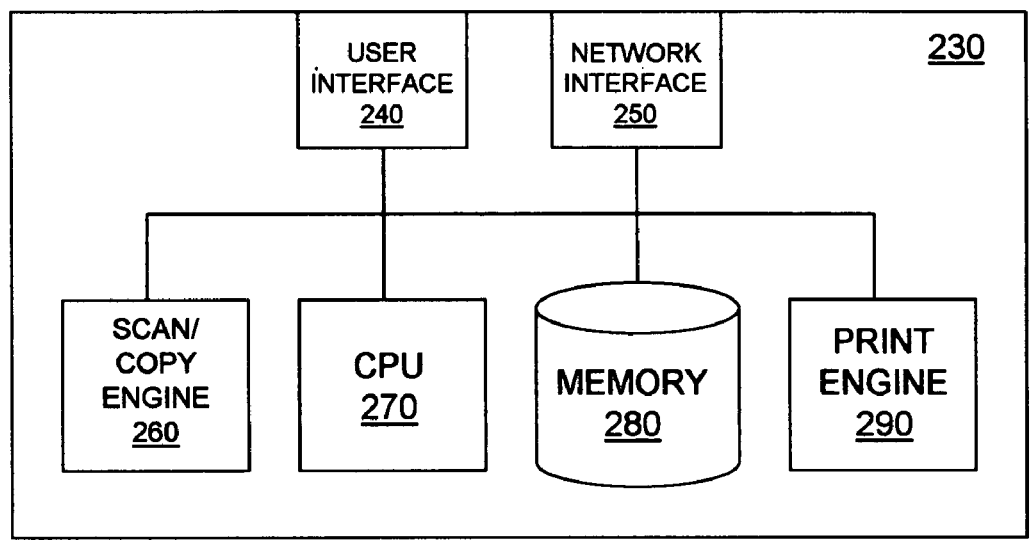
FIG. 2B shows a printing node in which methods and systems for facilitating remote access and customization of internally generated printing node status reports are operative in some embodiments of the invention.

In FIG. 2B printing node 230 is shown in more detail in some embodiments of the invention. Printing node 230 is a multifunction printer (MFP) that supports multiple functions, such as printing, scanning and copying. Printing node 230 has a user interface 240 for accepting commands from a user and displaying output to a user. Printing node 230 also has a network interface 250 for receiving requests from and transmitting responses to data communication nodes, such as remote node 210. Internal to printing node 230, interfaces 240, 250 are communicatively coupled with a processor (CPU) 270, a memory 280 a scan/copy engine 260 and a print engine 290. Scan/copy engine 260 includes scanner/copier logic, such as one or more integrated circuits (ICs), and a mechanical section for performing a scanning and copying functions. For example, scan/copy engine 260 may have a line image sensor mounted on a movable carriage for optically scanning a document under the control of a scanner IC and storing the scanned document into memory 280. Print engine 290 includes printer logic, such as one or more ICs, and a mechanical section for performing printing functions. For example, print engine 290 may have a color ink jet head mounted on a movable carriage for printing a document under the control of a printer IC. While in the illustrated embodiments a printing node 230 that supports scanning, copying and printing is shown, in other embodiments of the invention an MFP that supports additional or different functions, such as foxing, or a single-function printing device without scanning or copying capabilities may be employed.

Continuing with FIG. 2B, memory 280 includes one or more random access memories (RAM) and one or more read-only memories (ROM). An operating system installed in memory 280 and executed by processor 270 manages operations on printing node 230 by creating, scheduling and performing various printing, scanning, copying, spooling, diagnostic and other tasks. Tasks that are performed attendant to facilitating remote transmission and customization of internally generated printing node status reports include statistics collection, statistics text formatting, print data generation, text format recovery and XML processing. The first of these tasks, statistics collection, is prompted by the receipt of a request for printing node status information on network interface 250.

Figure 1:
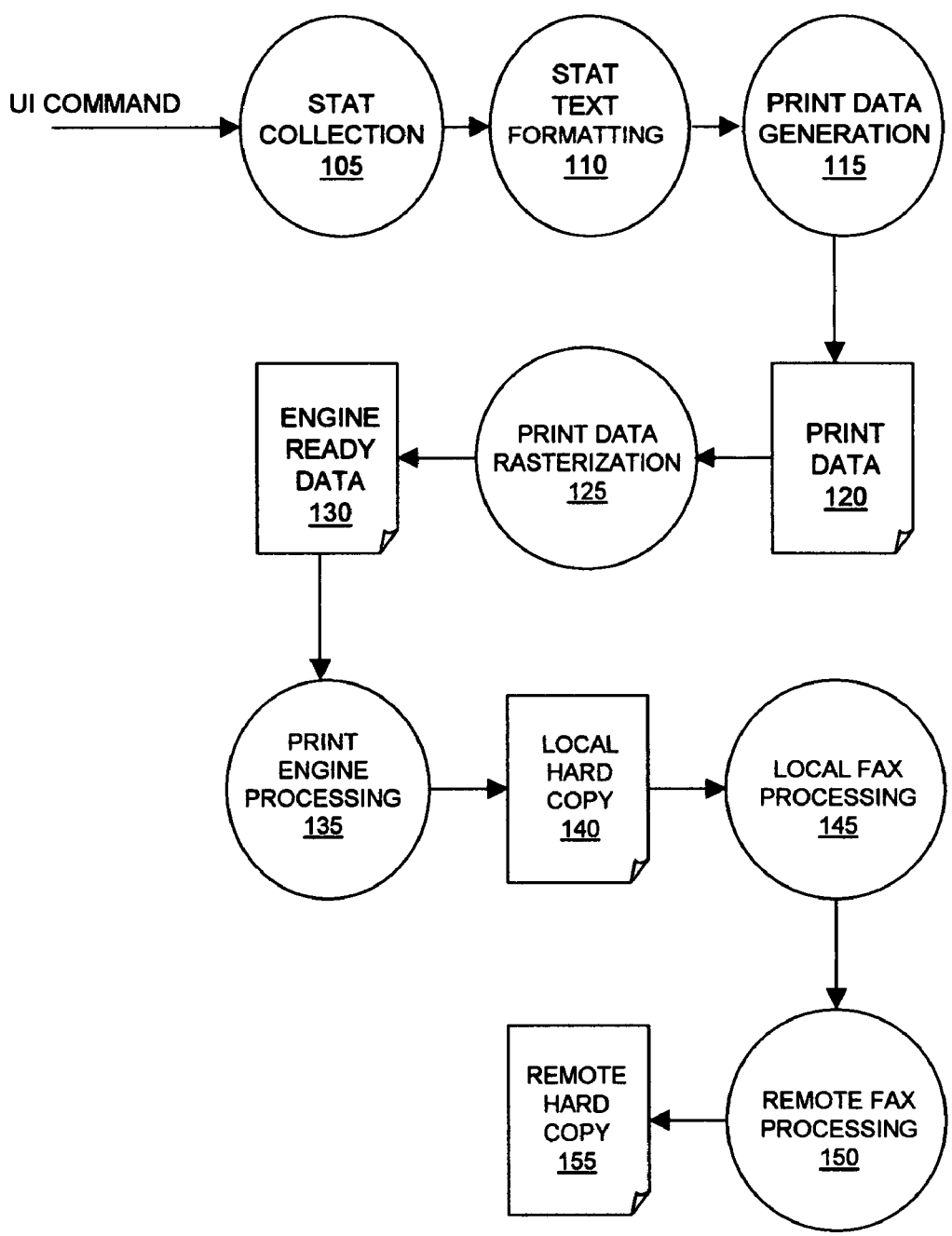
FIG. 1 shows a prior art method for internal printing node status report generation and remote transmission.

It will be appreciated from the earlier discussion of FIG. 1 that it is well-known to perform, in response to a locally initiated command received on a user interface of a printing node, statistics collection 105, statistics text formatting 110 and print data generation 115 to generate print data 120, and thereafter perform the task of print data rasterization 125 to generate print engine-ready data 130 for download to a print engine for processing, culminating in the printing of a local hard copy 140 of a printing node status report in a style determined by the printing node. The illustrated embodiments of the present invention, as will be explained, leverage these well-known diagnostic and printing tasks to provide novel systems and methods that extend the capability of printing nodes by also enabling receipt, processing and response to remotely initiated requests for printing node status reports of the printing node in a manner that permits remote customization of the style of the printing node status reports.

Figure 3:
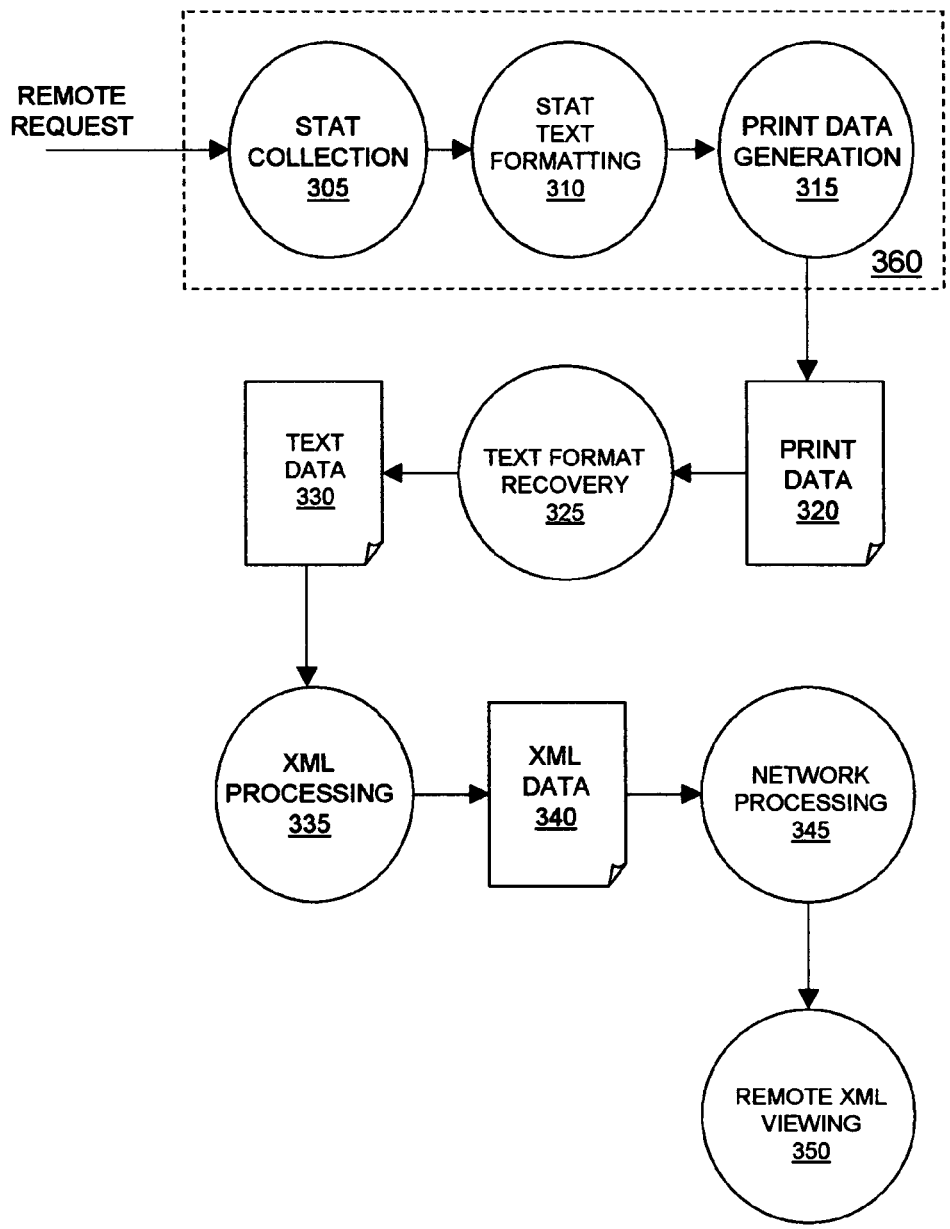
FIG. 3 shows a method for internal printing node status report generation and remote transmission in which text format recovery is performed on print data in some embodiments of the invention.

Turning now to FIG. 3, a method for internal printing node status report generation and remote transmission in which text format recovery is performed on print data is shown. The process flow begins when a remote request initiated by remote node 210 is received on network interface 250. The request may be a packetized HTTP/HTML request, Web Services request or email request, for example. The request is forwarded to processor 270 which performs well-known tasks 360. First, processor 270 performs a statistics collection task 305. The statistics collection task 305 may compile and synthesize pre-stored statistics and statistics generated in real-time through evaluative tests of hardware and software, for example. The statistics may identify hardware and software misconfigurations, oversubscriptions, defects and faults, for example. Next, processor 270 performs a statistics text formatting task 310. The statistics text formatting task 310 applies minimal formatting to the statistics, such as adding text position information. Application of text position information may include, for example, associating page, column and line numbers with statistics. Next, processor 270 performs a print data generation task 315. The print data generation task 315 converts the minimally formatted statistics into print data 320 represented in a PDL that determines the appearance of one or more pages adapted for printing on printing node 230, but at a higher level than engine-ready data that has an actual output bitmap.

At that point, in a departure from well-known processing, processor 270 performs a text format recovery task 325. The text format recovery task 325 performs a PDL-text translation that parses print data 320, extracts statistics and associated position information and generates text data 330. In this regard, text format recovery task 325 can be viewed as performing a reverse translation on print data 320 that removes printer-specific formatting from statistics. Processor 270 then performs an XML processing task 335 that serializes text data 330 into XML data 340. XML data 340 includes the statistics and retains generic layout elements of the internal printing format, such as page boundaries, line boundaries and column positions of text sequences. However, the presentation style in of XML data 340, for example, the font, spacing, color, and so on, may be customized on remote node 210 based on the application of an XML style sheet selected by remote node 210. Processor 270, in conjunction with network interface 250, then performs a network processing task 345 in which a packetized response including the statistics formatted as XML data 340 is generated and transmitted to remote node 210, which views XML data 340 using an XML style sheet selected by remote node 210. The response may be a packetized HTTP/HTML response, a Web Services response or an email reply, for example. In some embodiments, the response specifies a default XML style sheet, which specification remote node 210 may accept or ignore.

Figure 4:
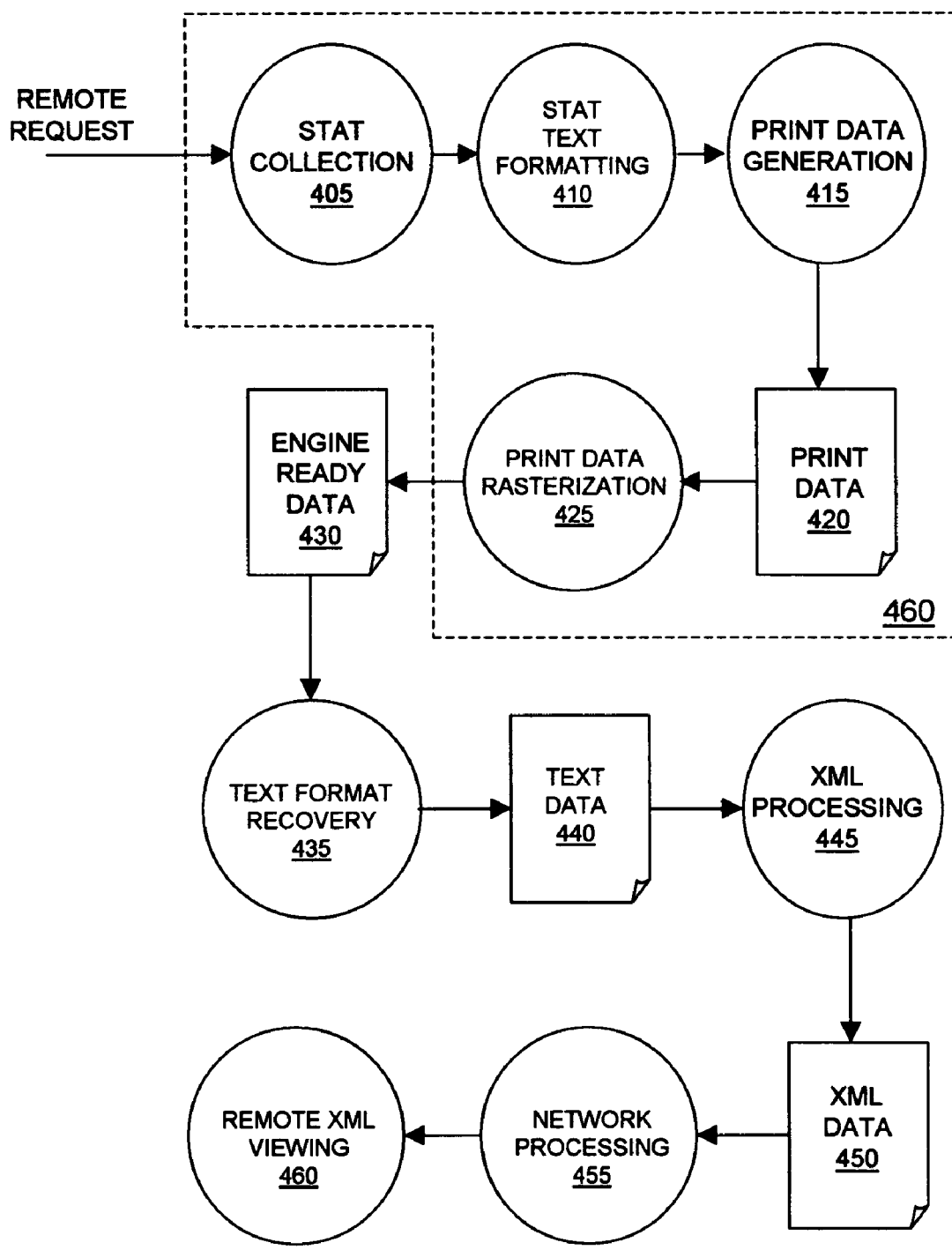
FIG. 4 shows a method for internal printing node status report generation and remote transmission in which text format recovery is performed on print-engine ready data in some embodiments of the invention.

FIG. 4 shows a method for internal printing node status report generation and remote transmission in which text format recovery is performed on print-engine ready data. The process flow begins when a remote request initiated by remote node 210 is received on network interface 250. The request is forwarded to processor 270 which performs well-known tasks 460, including a statistics collection task 405, a statistics text formatting task 410 and a print data generation task 315 resulting in print data 420 represented in a PDL that determines the appearance of one or more pages adapted for printing on printing node 230, but at a higher level than engine-ready data that has an actual output bitmap. Then, continuing the well-known processing that normally leads to printing of a local hard copy of a printing node status report, processor 270 performs a print data rasterization task 425, that is, RIP, which converts the print data 120 into print engine-ready data 430. Print engine-ready data 430 includes one or more pages having an actual output bitmap adapted for printing on printing node 230.

At that point, in a departure from well-known processing, processor 270 performs a text format recovery task 435. The text format recovery task 435 invokes an optical character recognition (OCR) process to extract statistics and associated position information from engine-ready data 430 and generate text data 440. Processor 270 then performs an XML processing task 445 that serializes text data 440 into XML data 450. Processor 270, in conjunction with network interface 250, then performs a network processing task 455 in which a packetized response including the statistics formatted as XML data 450 is generated and transmitted to remote node 210, which views XML data 450 using an XML style sheet selected by remote node 210. In some embodiments, the response specifies a default XML style sheet, which specification remote node 210 may accept or ignore.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A printing node, comprising:
a network interface; and
a processor communicatively coupled with the network interface, wherein the processor receives from a remote node via the network interface a request for a printing node status report and in response to the request generates printing node diagnostic information, generates one or more formatted status report pages in a bitmap format adapted for printing on the printing node and containing the diagnostic information, extracts the diagnostic information from the formatted and unprinted status report pages using an optical character recognition process, generates one or more reformatted status report pages adapted for customizable viewing on the remote node and containing the diagnostic information and transmits to the remote node via the network interface a response including the reformatted status report pages.

2. The printing node of claim 1, wherein the reformatted status report pages are in an XML format.

3. The printing node of claim 1, wherein the request is an HTTP/HTML request.

4. The printing node of claim 1, wherein the request is a Web Services request.

5. The printing node of claim 1, wherein the request is an email request.

6. The printing node of claim 1, wherein the response includes a default XML style sheet.

7. The printing node of claim 1, wherein the diagnostic information includes information regarding one or more of printing node hardware or software.

8. A method for facilitating remote access and customization of printing node status reports, comprising the steps of:
receiving by a printing node from a remote node a request for a printing node status report;
generating by the printing node printing node diagnostic information;
generating by the printing node one or more formatted status report pages in a bitmap format adapted for printing on the printing node and containing the diagnostic information;
extracting by the printing node the diagnostic information from the formatted and unprinted status report pages using an optical character recognition process;
generating by the printing node one or more reformatted status report pages adapted for customizable viewing on the remote node and containing the diagnostic information; and
transmitting by the printing node to the remote node a response including the reformatted status report pages.

9. The method of claim 8, wherein the reformatted status report pages are in an XML format.

10. The method of claim 8, wherein the request is an HTTP/HTML request.

11. The method claim 8, wherein the request is a Web Services request.

12. The method of claim 8, wherein the request is an email request.

13. The method of claim 8, wherein the response includes a default XML style sheet.

14. The method of claim 8, wherein the diagnostic information includes information regarding one or more of printing node hardware or software.

* * * * *